Feb. 15, 1944.　　　　E. R. CLARK　　　　2,342,035
FILTERING APPARATUS
Filed Jan. 15, 1941　　　2 Sheets-Sheet 1

INVENTOR
EDGAR R. CLARK
BY William J. Barnes
ATTORNEY

Feb. 15, 1944.  E. R. CLARK  2,342,035
FILTERING APPARATUS
Filed Jan. 15, 1941  2 Sheets-Sheet 2

INVENTOR
EDGAR R. CLARK
BY
ATTORNEY

Patented Feb. 15, 1944

2,342,035

UNITED STATES PATENT OFFICE 2,342,035

FILTERING APPARATUS

Edgar R. Clark, Syracuse, N. Y., assignor to United States Hoffmann Machinery Corporation, New York, N. Y., a corporation of Delaware Application January 15, 1941, Serial No. 374,443

2 Claims. (Cl. 210—153)

This invention relates to an improved filtering system for removing various kinds of suspended matter from liquids.

In some of the systems now in use, it is customary to use, as the so-called filter aid, a coating of finely divided material on the filter screens which removes unwanted suspended matter from the liquid as it passes through the meshes of the screens. This filter aid may be diatomaceous earth, such as kieselguhr, or it may be fuller's earth, wood pulp, or one of many other well known materials, or combinations of them, as considered necessary for the particular filtering work at hand.

The filter aid is usually applied to the screens by a precoating step in which it is added in a finely divided form to a liquid flowing through the screens until the desired coating of filter aid has been built up on the screens. Thereafter, the liquid to be filtered is caused to flow through the filter and its suspended matter is removed by the filter aid. After each operation it is necessary to apply a new coating of filter aid regardless of whether the filtering properties of the previous coating had been exhausted. The necessity for thus precoating with filter air each time the flow of the liquid to be filtered is interrupted, is not only time consuming and expensive but necessitates the more frequent removal of sludge from the bottom of the apparatus which is a particularly troublesome and expensive operation.

An important object, therefore, of the present invention is to provide a filtering system in which the filter aid is maintained in filtering position on the screen by a continuous circulation of liquid.

A further object is to provide an arrangement in which filtrate flows through the screens automatically whenever the apparatus using the filtrate is shut down, and so maintains the filter aid in position for instant operation when the liquid to be filtered is again circulated through the system.

It is also an object of the invention to provide an arrangement whereby liquid may be continuously supplied to the work at hand even though the filter screens be clogged up or rendered otherwise inoperative.

Another object is to provide visual means to determine when the filter aid and its accumulated material removed from the liquid should be removed from the screens.

Figure 1:
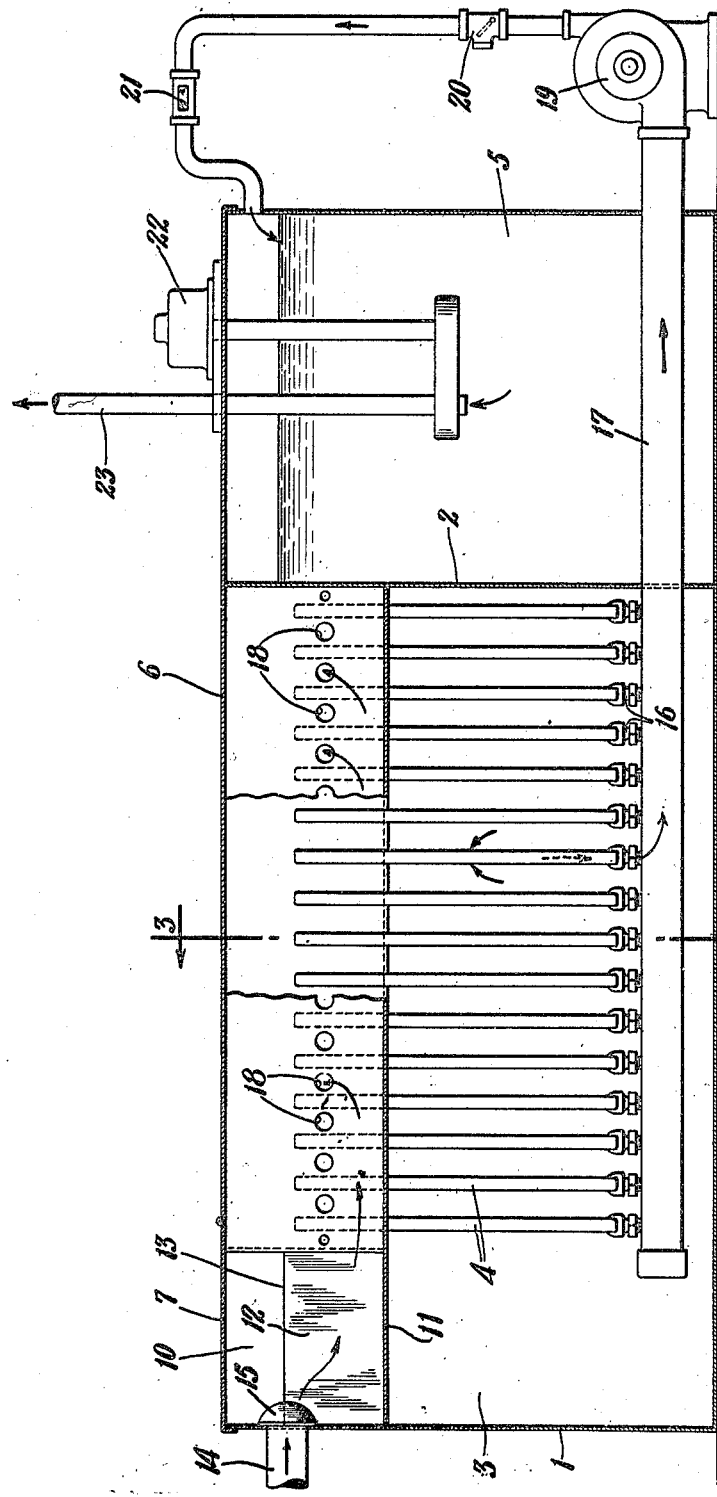
Figure 2:
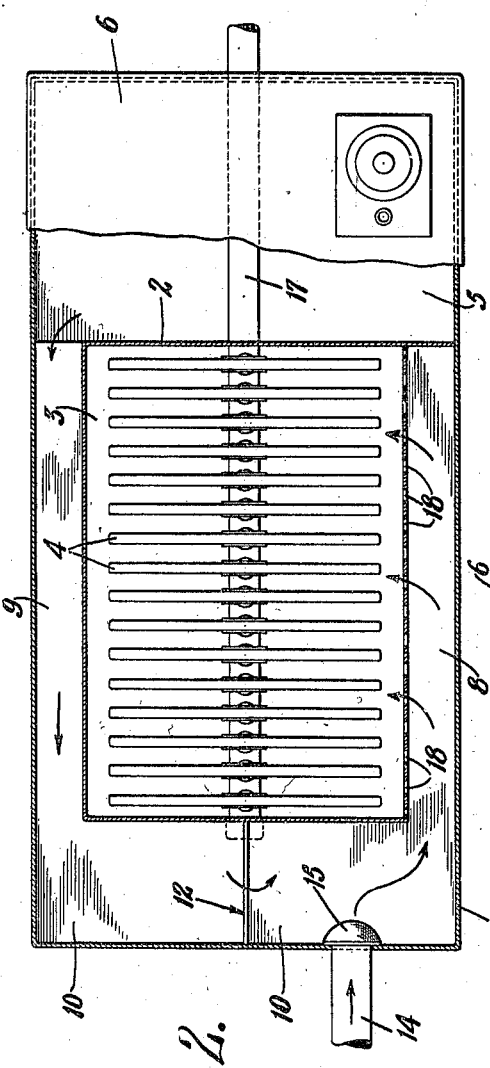
Figure 3:
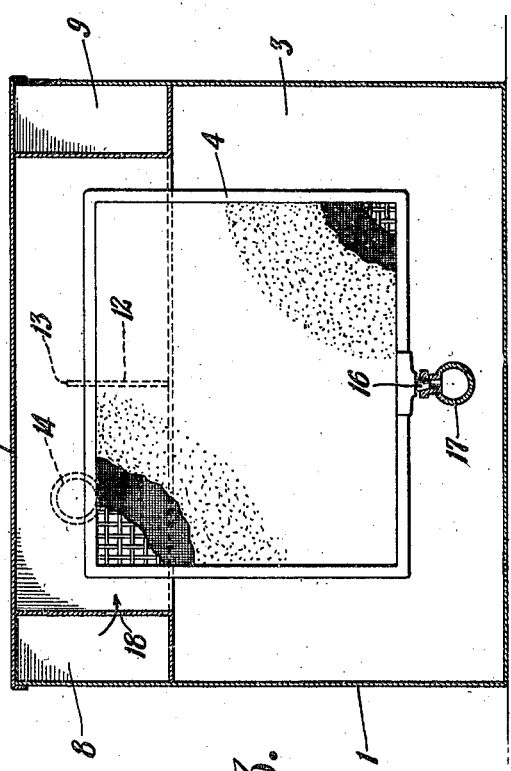

In the accompanying drawings, Fig. 1 is a side view, partially in section, of a filtering system embodying a preferred arrangement of the present invention; Fig. 2 is a plan view thereof, also partially in section, and Fig. 3 is a cross-sectional view taken on the line 3—3 of Fig. 1.

For convenience, the present invention may be described as it has been applied to the filtering of the coolant used on grinding machines, to remove the grinding dust, chips, etc., picked up by the coolant in its passage through the grinding machine. But it will be apparent that this invention is equally applicable in many other classes of filtering actions.

In the drawings, the numeral 1 indicates a tank which is preferably divided into two chambers by the transverse partition 2. The left hand chamber 3 contains a series of filter screens 4 while the right hand chamber 5 serves as a storage space, or reservoir, for the filtrate passing through the screens 4. The tank may be provided with a cover 6 having a hinged door 7 through which the filter aid may be introduced and through which the operation of the apparatus may be observed.

In the upper part of the chamber 3 there is a trough which, in the particular embodiment illustrated in the drawings, is substantially U-shaped, having, as clearly shown in Fig. 2, two parallel branches 8 and 9 running along the sides of the chamber 3, these branches being connected by a passageway 10. This trough may be of any suitable depth but as shown in Fig. 1 its bottom is represented by the line 11 making its depth about one third that of the tank 1. A weir 12 extends across the passageway 10 preferably on or near the centerline of the tank and may extend upward to the height represented by the line 13 in Fig. 1. The branch 8 which may be referred to as the inlet trough, extends to the partition 2 while the branch 9, conveniently called the filtrate trough, communicates directly with the storage chamber 5, the partition 2 being cut away for this purpose, as illustrated in Fig. 2.

The coolant from the grinding machine, or the other liquid to be filtered, enters the compartment 10 through the pipe 14, which is preferably provided with a screen 15.

The filter screens 4, located in the tank chamber 3, are of well known construction as shown in Fig. 3. Briefly, each screen consists of a rectangular frame with front and rear faces of suitable screen material, the mesh of which is selected according to the nature of the filtering action being undertaken. Each screen is provided with a nipple 16, which not only supports the screen upon the header 17 so that it may be removed readily for cleaning purposes, but also provides a connection between the screen and the header whereby the liquid which flows through the filter aid, and the screen mesh, flows through the nipple into the header 17.

The liquid to be filtered flows from the trough 10, along the branch 8 and thence through a series of holes or ports 18 into the screen chamber 3. Such holes may be, and preferably are, positioned slightly below the tops of the screens. Since the first and last holes have only one filter surface adjacent them they need be only half the area of the other holes.

It will of course be understood that various other arrangements of troughs could be used. Thus, for example, the inlet trough could be in two parts extending along opposite sides of the tank 1, so that the liquid to be cleaned would enter from both sides of the screen chamber, while the filtrate trough could be positioned between these two troughs, say along the longitudinal centerline of the tank 1.

The filtered liquid collected by the header 17 is brought to the top of the storage chamber, or reservoir 5, by the pump 19 which forces the filtrate through the check valve 20 and the sight glass 21 to the top of the reservoir 5.

The filtered liquid may be pumped from the reservoir 5 by means of the pump 22 which forces this liquid through the outlet pipe 23 to the grinding machine, or other apparatus to be supplied with the filtered liquid. The pump 19 has a greater output than the pump 22, for the reason hereinafter explained. As the filtered liquid is being thus withdrawn from the reservoir 5 it is replaced by incoming liquid entering through the inlet pipe 14 and flowing through the filtering screens 4, the header 17 and the pumping system just described.

The system may be operated in the following manner: Liquid is introduced through the pipe 14 to the inlet trough, from which it flows through the ports 18 to the chamber 3. At substantially the same time, filter aid is introduced into the liquid through the door 7 and is carried by the liquid into the chamber 3.

The pump 19 is then started and it causes liquid to flow through the screens. As this liquid carries filter aid in suspension, this aid is deposited on the surfaces of the screens and thereafter serves to remove the undesirable suspended matter in the liquid to be filtered. The filtrate thus obtainable flows through the screens and the header 17 to the reservoir 5. As the filtered liquid reaches the level of the filtrate trough 9 it flows into and through it and eventually over the weir 12 into the inlet trough. When sufficient filter aid has accumulated on the screens 4 and the filtered liquid in the reservoir is entirely clean, the pump 22 may be operated to force filtered liquid to the grinding machine, or other place of use; the filtered liquid thus pumped from the reservoir constantly being replaced by the return to the inlet trough of dirty liquid from the grinding machine, thus, again, maintaining a continuous circulation of liquid through the system and the filter aid on the faces of the screens 4.

Since the pump 19 has a greater capacity than the pump 22 which supplies the filtrate to the place of use, a portion of the filtrate will be caused to flow through the filtrate trough 9, so that if for any reason the grinding machine or other apparatus using the filtrate is temporarily shut down, filtrate will flow through the screens, thus maintaining the filter aid in position thereon and obviating the necessity for pre-coating before normal filtering action may be resumed. Also, it will be noted that the apparatus is so constructed that even if the screens should be so clogged up as to prevent the flow of liquid therethrough, the coolant could still be supplied to the grinding machine. In this event, the incoming dirty liquid would flow over the weir 12 in the reverse direction to its normal flow and through the trough 9 to the storage reservoir 5 from which it could be recirculated through the grinding machine by the pump 22.

The flow of liquid in the reverse direction over the weir 12, as above described, may be readily observed through the door 7. It is, of course, an indication that the filter aid and the accumulations thereon should be removed from the screens and this may be done by scraping the screens with a suitable tool in the usual manner.

I claim:

1. A filtering system comprising a receptacle having a plurality of chambers one of which constitutes a storage reservoir for filtrate, means for delivering filtrate from said reservoir to a place of use at a uniform rate, a second chamber containing one or more screens adapted to support filter aid thereon, a discharge header communicating with said screens, an inlet passageway receiving liquid from the place of use and having ports through which the liquid may flow into said screen chamber, means for conveying filtrate from said header to said storage reservoir, a second passageway communicating with said reservoir and said inlet passageway whereby filtrate in excess of that discharged to the place of use is returned to the said screen chamber, said second passageway being sufficiently open and unobstructed to permit accumulated liquid to flow back into the reservoir if the flow of such liquid through said screen is prevented.

2. A filtering system comprising a circuit including a reservoir for filtrate, means for supplying the filtrate from the reservoir to a station at which it is used, a filter having filter aid supported thereon, an inlet passageway for feeding liquid to the filter and communicating with said reservoir, means for returning soiled liquid from said station to said passageway, and weir means between said passageway and reservoir over which filtrate may flow from the reservoir to the passageway for recirculation through the filter.

EDGAR R. CLARK.